Oct. 16, 1923.

E. G. STAUDE 1,470,701

AUTOMATIC BRAKE CONTROL FOR POWER PROPELLED VEHICLES

Original Filed Nov. 10, 1915  5 Sheets-Sheet 1

WITNESSES

INVENTOR
EDWIN G. STAUDE
BY Paul Paul
ATTORNEYS

FIG. 10.

Patented Oct. 16, 1923.

1,470,701

UNITED STATES PATENT OFFICE.

EDWIN GUSTAVE STAUDE, OF MINNEAPOLIS, MINNESOTA.

AUTOMATIC BRAKE CONTROL FOR POWER-PROPELLED VEHICLES. REISSUED

Application filed November 10, 1915, Serial No. 60,751. Renewed March 22, 1920. Serial No. 367,827.

*To all whom it may concern:*

Be it known that I, EDWIN G. STAUDE, citizen of the United States, resident of Minneapolis, county of Hennepin, State of Minnesota, have invented certain new and useful Improvements in Automatic Brake Controls for Power-Propelled Vehicles, of which the following is a specification.

In the operation of a power propelled vehicle, such as an automobile, several operations are necessary to throw out the clutch and set the brake, considerable effort on the part of the driver and a little time being required to perform these operations.

The object of my invention is to provide means for automatically disengaging the clutch of a power propelled vehicle.

A further object is to dispense with a manually operated brake mechanism and prevent the application of the brake until the clutch is released.

A further object is to provide an inelastic fluid brake with such connections that it cannot be applied without first closing the engine throttle, and a brake that is easily controlled and equipped to develop any desired power for stopping the vehicle.

A further object is to provide an inelastic fluid brake which is extremely sensitive in action and easily controlled, and being mounted in the transmission casing uses the oil therein, thereby dispenses with an additional oil receptacle, does not add materially to the bulk of the transmission, and eliminates the annoyance of leakage due to exposed packed joints.

A further object is to provide an apparatus which will be positive and reliable in its action.

The invention consists generally in various constructions and combination, all as hereinafter described and particularly pointed out in the claims.

In the accompanying drawings forming part of this specification.

In the drawing I have illustrated a preferable construction in which 2 represents the casing of a transmission gearing. 3 is the drive shaft from the clutch of an internal combustion engine (not shown), having bearings at 4 in the transmission casing. 5 is a pinion, having external teeth 6. A gear 8 is mounted to slide on a shaft 9 and has internal teeth 10 to mesh with the teeth 6, and the shaft 9 has bearings 7 and 7', the former in the pinion 5. The gear 8 is moved back and forth, into or out of engagement with the pinion 5 by a clutch arm 11. The shaft 9 projects through the casing of the transmission gearing and has means for connection with the rear axle (not shown). The pinion 5 meshes with a gear 12 keyed on a shaft 13 that is journaled in the lower walls of the transmission casing, the face of the pinion 5 being of sufficient width to allow engagement of the teeth 6 with the teeth 10 of the gear 8 and the gear 12 at the same time. This engagement of the gear teeth 10 with the pinion 5 is made when a direct drive is desired.

A gear 14 is also splined on the shaft 9 and has an operating arm 11ᵃ corresponding to the one described, and gears 15 and 16 of different size are keyed on the shaft 13 in the same manner as the gear 12. These gears provide for a variable speed, as usual in transmissions of this kind.

I also provide a gear 17 on the shaft 13 in connection with an idle gear 17' for meshing with the large gear 14 to reverse the driving shaft. This is ordinary construction in a transmission reversing gear and I make no claim to the same herein.

Figure 1:
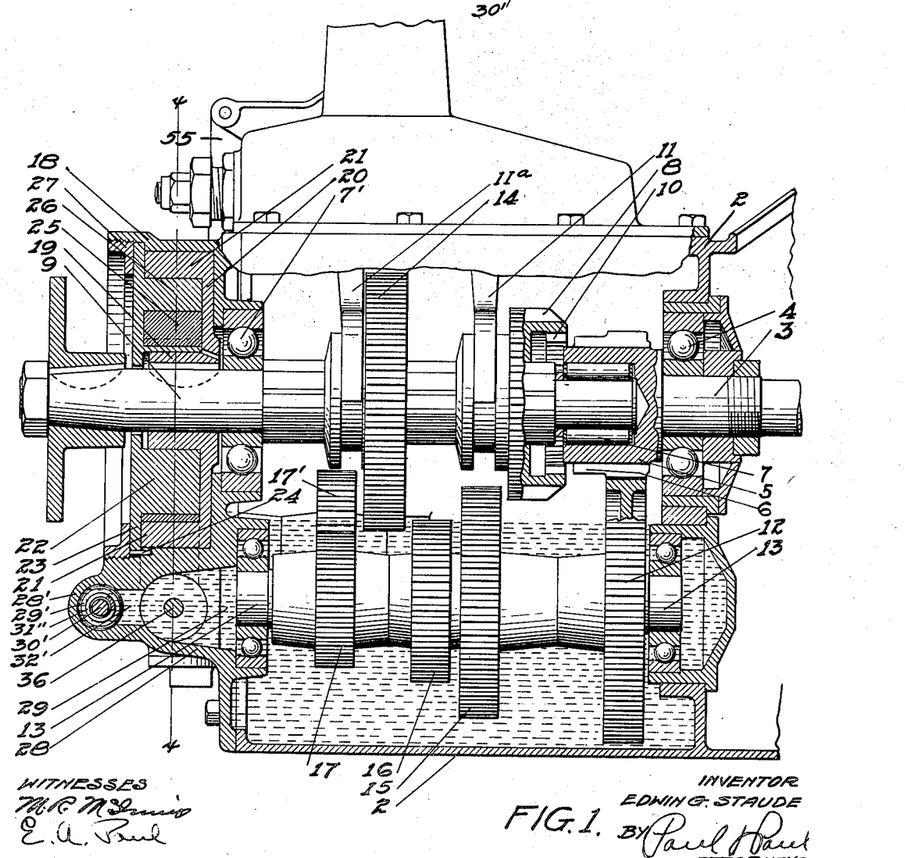
Figure 1 is a sectional view through the casing of a transmission gearing of ordinary construction, illustrating the application of my invention thereto.
Figure 2:
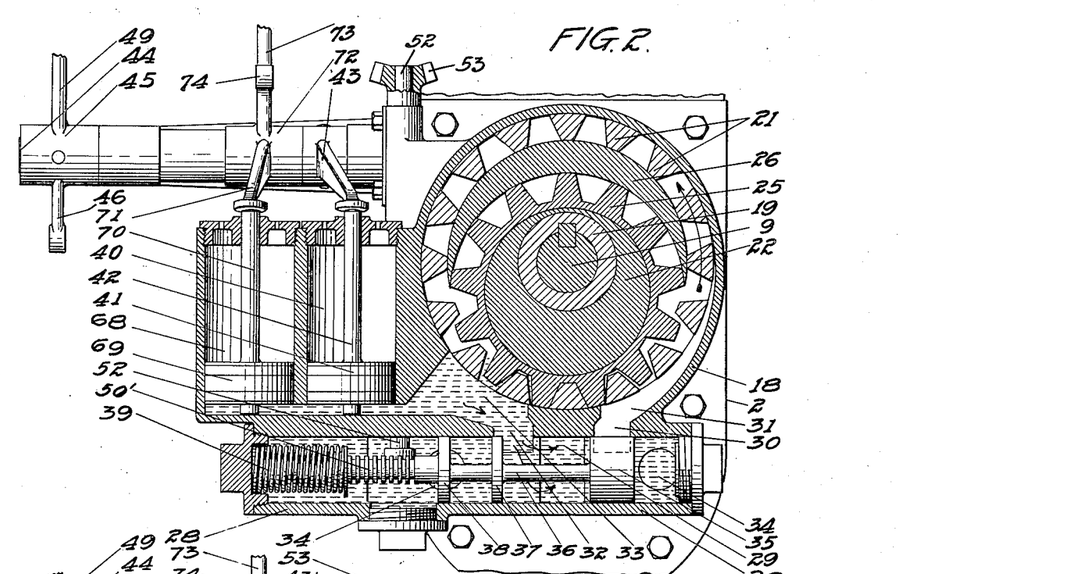
Figure 2 is a sectional view through the brake control mechanism taken on line $x$—$x$ of Figure 1, showing the normal running position of the parts.
Figure 3:
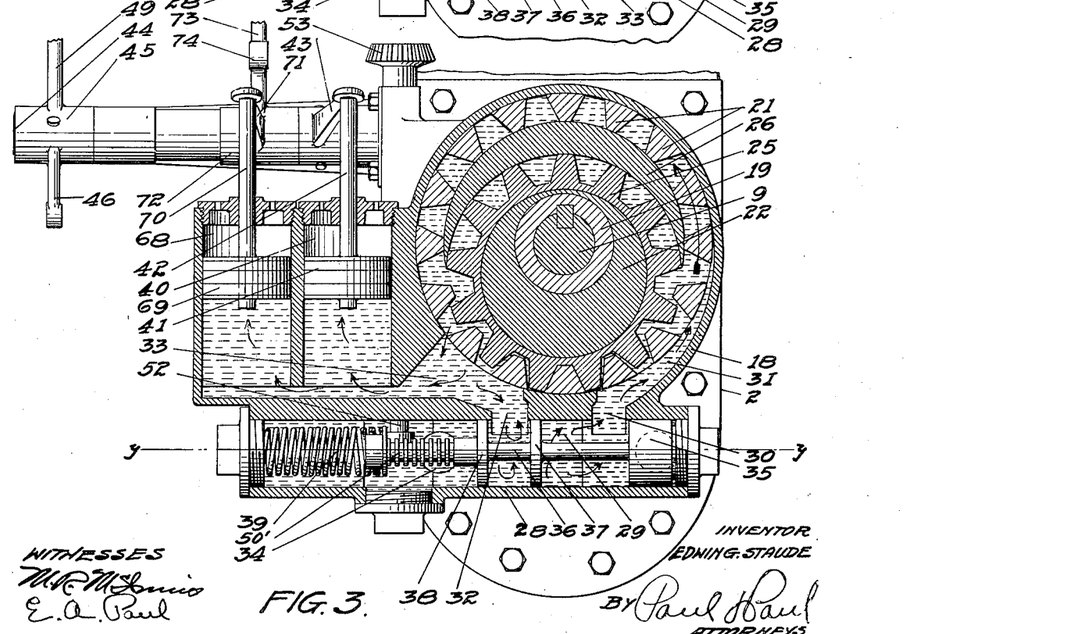
Figure 3 is a similar view also taken on line $x$—$x$ of Figure 1, illustrating the parts in position for setting the brake and throwing out the clutch.

I will now proceed to describe in detail the application of my invention to the transmission gearing which may be of any preferred or usual construction. 18 is a housing, forming an extension at one end of the transmission gearing casing. 19 is a hub, keyed on the shaft 9 and provided with a radial flange 20, from which a series of teeth 21 project, parallel with the axis of the hub (Figures 1, 2 and 3). An eccentric 22 is seated on the hub 19 and is carried by a plate 23 secured to the housing by pins 24 or other suitable means. A gear 25 is loosely mounted on the eccentric 22 and a crescent-shaped web 26 is carried by the plate 23 between the upper portion of the gear 25 and the teeth 21 at the top of the housing. An exteriorly threaded ring 27 is provided to engage an interiorly threaded flange on the housing and is seated against the plate 23 for holding it and the parts described in their proper relative position. When the shaft 9 is revolved, the hub 19 and flange 20, carrying the teeth 21, will be revolved also, the teeth 21 meshing with the teeth of the loosely mounted gear 25. These parts are constantly lubricated by the supply of oil in the transmission casing.

Beneath the housing 18 is a valve casing 28 communicating through a port 29 with the lower portion of the transmission casing and through a port 30 with a chamber 31. A port 32 leads from the valve casing to a chamber 33 and the ports 34 form a communicating passage between the valve casing and the chamber in the transmission casing to equalize the pressure and provide for freedom of movement of the valve.

A valve plunger 35 is mounted to slide in the casing and has a stem 36 on which discs 37 and 38 are mounted. These discs are spaced apart sufficiently to bridge the port 32 and are so disposed with respect to the head 35 that when the disc 37 is on one side of the port 32 and the disc 38 on the same side, as indicated in Figure 2, the head 35 will be in position to close the port 30 while, if the head 35 be moved to the end of the valve casing, out of register with the port 30, the discs 37 and 38 will be disposed one upon each side of the port 32 and prevent the flow of fluid through the valve casing from the port 32 to the port 29.

A spring 39 is provided in the casing for holding the valve at one end thereof and the head 35 out of alignment with the port 30. The transmission casing is adapted to contain an inelastic fluid, such as oil, which rises to a level above the valve casing 28 and may circulate therein through the port 29. The revolution of the gear teeth 21 co-operating with the gear 25 will operate as a pump to lift the fluid from the chamber 31 around to the chamber 33, the type of pump being a well-known construction and to which I make no claim in this application.

Figure 4:
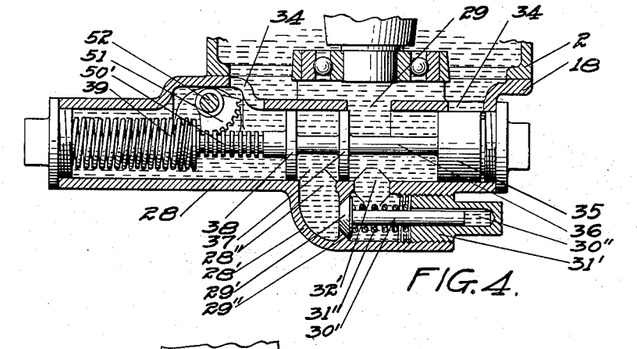
Figure 4 is a plan section, through a portion of the apparatus, taken on line $y$—$y$ of Figure 3, showing the controlling valve and operating means therefor.
Figure 5:
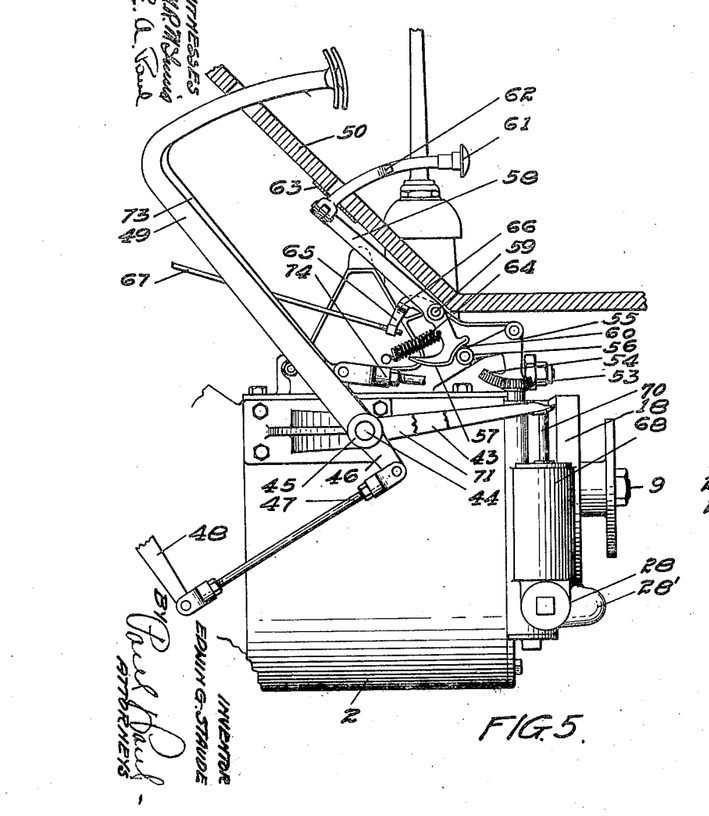
Figure 5 is a view illustrating the application of the invention to the control foot levers of a vehicle.

If the valve is in the position shown in Figure 3, the passage through the port 29 in the casing 28 from the port 32 will be closed, and as the oil continues to be pumped into the chamber 33, some relief for the pressure must be found and I make use of it in the following manner:

A cylinder 40 communicates with the chamber 33 and is provided with a plunger 41 having a stem 42 in position to engage an arm 43 that is fastened on the shaft 44. A hub 45 is secured on said shaft and has an arm 46 connected through a rod 47 to a lever 48 of the engine clutch (not shown). A treadle 49 extends up through the foot board 50 in position to be operated by the foot of the driver of the car. When the valve is thrown to the position indicated in Figure 3, the passage 29 will be closed and the inelastic fluid accumulating in the chamber 33 will raise the plunger 41 and rock the shaft 44 to release the clutch, doing this automatically when the driver releases the mechanism to shift the valve from the position shown in Figure 2 to that shown in Figure 3. The movement of the valve is preferably effected by the following described mechanism:

A rack 50' is provided on the valve stem, meshing with a quadrant 51 on an upright shaft 52 having suitable bearings in the housing of the transmission and provided at its upper end with a pinion 53 meshing with a rack 54 on one arm of a bell crank 55 (Figure 4). The other arm of the bell crank has an anti-friction roller 56 mounted to travel on a curved surface 57 provided at one end of a lever 58 that is pivoted at 59 beneath the foot board 50. The surface 57 has a cam extension 60 which, engaging the roller 56, causes the bell crank 55 to oscillate and revolve the shaft 52, thereby effecting movement of the valve stem 36. A treadle 61 is pivotally connected with the lever 58 and projects up through the foot board 50 and a stop lug 62 is provided on said treadle to engage a plate 63 and hold the lever and treadle in the position indicated in Figure 6 until the treadle is moved to one side on its pivotal connection with the lever sufficiently to disengage the stop lug, whereupon the spring 64 will return the lever and treadle to the normal position indicated in Figure 5.

An arm 65 has a shoulder 66 in the path of the lever 58 and a rod 67 connects the arm 65 with the throttle. The initial movement of the lever 58 from the position shown in Figure 5 to that shown in Figure 6 will shift the valve stem 36 to the position shown in Figure 2, where the pump device will be inactive. Further movement of the treadle 61 will engage the lever 58 with the shoulder 66 and operate the throttle, the treadle device then having the function of an accelerator, and this use may continue with the further operation of the car until such time as it is desired to effect an automatic operation of the clutch. The driver will then release the treadle 61, allowing it to return through the power of the spring 64 to the position shown in Figure 5, whereupon the spring 39, being released, will throw the valve to the position illustrated in Figure 3 and the operation of the pump will create sufficient pressure in the chamber 33 to raise the plunger 41 and release the clutch.

I may also provide another cylinder 68 communicating with the chamber 33 and having a piston 69 and stem 70 in position to engage an arm 71 on a hub 72 that is loosely mounted on the shaft 44 and provided with a treadle 73 corresponding to the treadle 49 and having a connection 74 with the brake (not shown). Simultaneously, therefore, with the release of the clutch the plunger 69 will be raised to rock the hub 72 and set the brake.

In case there should be an extreme pressure created in the chamber 33, I prefer to provide a relief consisting preferably of arranging an extension 28' on the housing 28 having a port 28'' communicating with the valve chamber (Figure 4). A valve 29' is provided within said extension and has a seat 29'' and a stem 30' fitting a socket 30'' in a plug 31' that is tapped into said extension. The inner end of the plug engages a spring 31'' that encircles the stem 30' and holds the valve against its seat with a yielding pressure, and a port 32' leads from the space within the extension on the opposite side of the valve 29' from the port 28'' into the valve chamber. When, therefore, an extreme pressure is produced that is unnecessary for the work to be performed, the valve 29' will be opened against the tension of its spring to provide a return passage into the transmission casing and permit the escape of the inelastic fluid therethrough. The degree of pressure in the pumping chamber before relief can, of course, be regulated by the movement of the plug 31' and the tension of the spring 31''.

Figure 9:
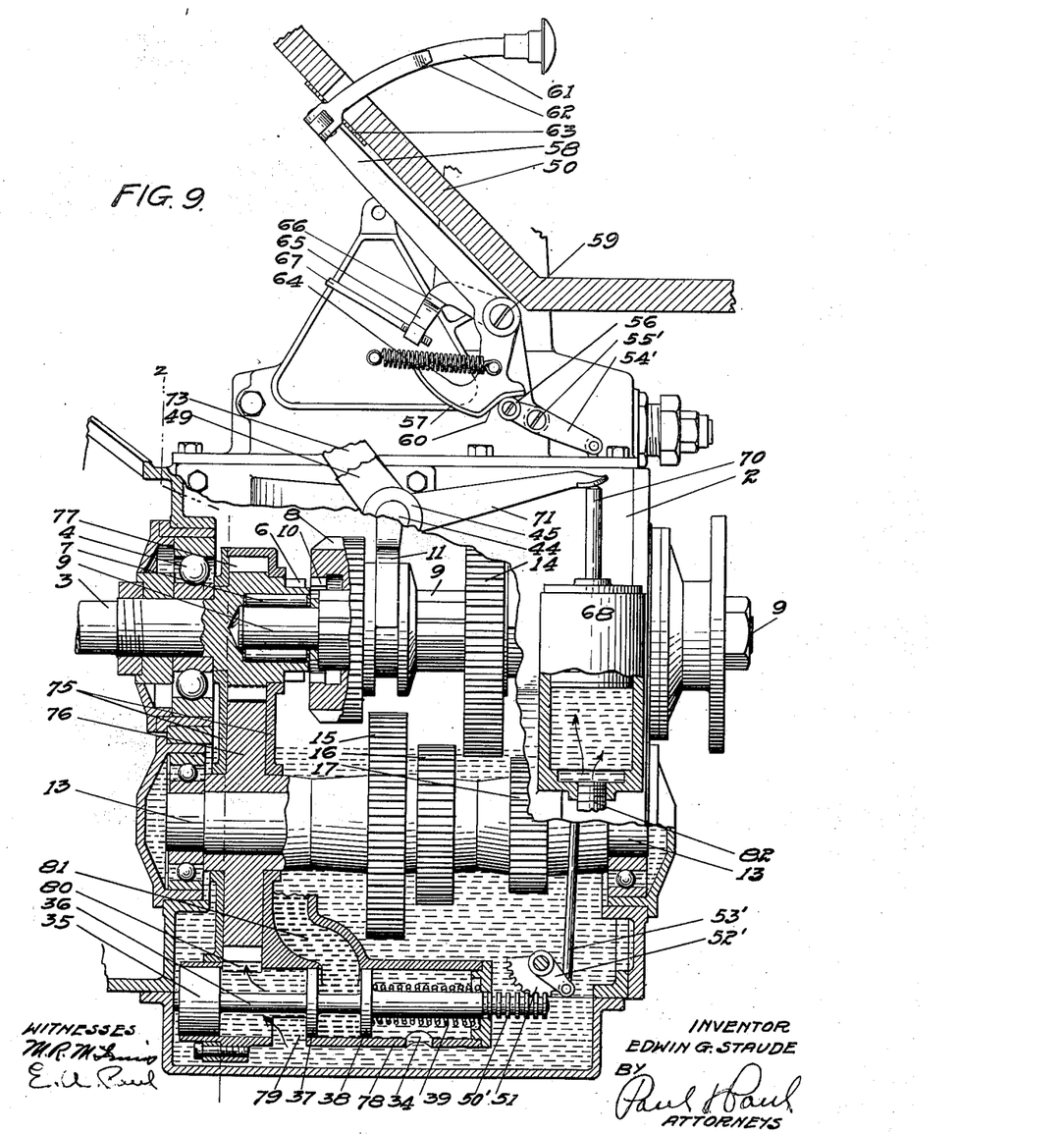
Figure 9 is a sectional view of a modified construction.
Figure 10:
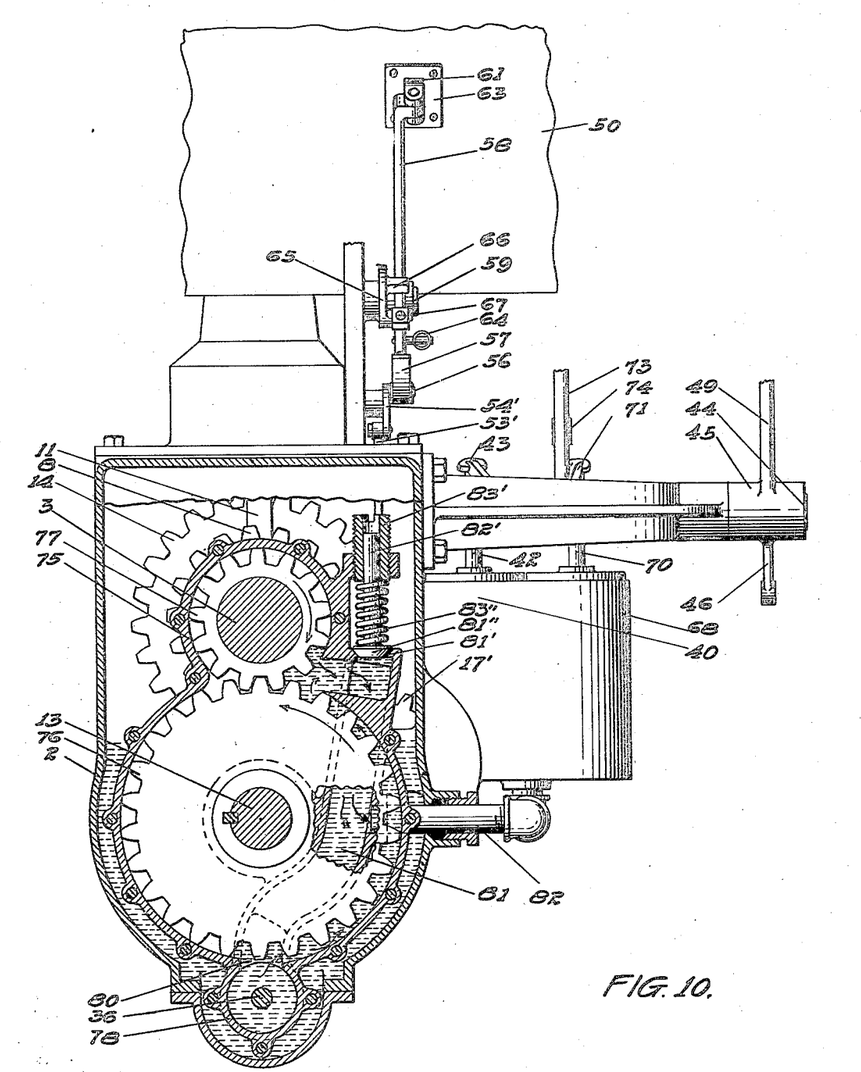
Figure 10 is a vertical sectional view through the same, on line $z$—$z$ of Figure 9.

In Figures 9 and 10 I have shown a slightly modified construction, which consists in mounting the pumping device entirely within the walls of the transmission casing and using the gear and pinion for pumping the oil to create a pressure sufficient to operate the clutch and brake pistons that are at present employed for driving the counter shaft of an ordinary selective type of transmission gearing. The transmission casing and the gearing corresponding to that heretofore described, I will indicate by the same reference numerals.

A housing 75 is provided within the transmission casing enclosing a gear wheel 76 mounted on the shaft 13 and meshing with a pinion 77 on the shaft 3, said pinion having a suitable clutch connection for engagement with the gear 10 in the manner already described with reference to Figure 1.

In the lower part of the transmission casing is a valve casing 78 in which a valve corresponding to the one heretofore described is mounted. The valve casing has a port 79 communicating with the interior of the transmission casing and a port 80 leading through the wall of the housing 75 to supply the inelastic fluid to the pumping gears. A passage 81 leads from the upper portion of the housing 75 to the valve casing and a pipe 82 communicates with this passage and with the lower portion of the cylinders 40 and 68 for delivering the inelastic fluid thereto for the purpose of operating the clutch and brake plungers.

When the parts are in the position indicated in Figure 9, the inelastic fluid will be pumped up through the port 80 by the engagement of the teeth of the gear 76 with the pinion 77 and the outlet from the passage 81 being closed by the position of the valve, it follows that the fluid pressure must be discharged through the pipe 82 into the clutch and brake plunger cylinders. This pressure in the cylinders will raise the plungers and automatically disengage the clutch and set the brake, the adjustment of the valve being obtained through the operation of the control lever in the manner heretofore described with reference to the other construction.

The quadrant 51, meshing with the rack of the valve, is preferably provided with a crank arm 52', and a rod 53' leading upwardly from this arm to a lever 54' pivoted at 55'. An anti-friction roller 56 is mounted on one end of this lever and contacts with the surfaces 57 and 60 of the accelerator lever 58 in substantially the same manner as shown and described with reference to Figure 6.

The relief for the pressure of oil in the pumping chamber and the passage 81 is obtained by providing a port 81' in the upper part of the passage (Figure 10), normally closed by a valve 81'' having a stem 82' that is slidable in a socket in a plug 83' that is tapped into the housing of the pump gears and may be moved longitudinally to increase or decrease the tension of a spring 83'' which encircles the stem 82' and bears on the valve disc with a yielding pressure. Evidently this pressure can be increased or diminished by the adjustment of the plug and an escape or relief provided for the inelastic fluid in the passage 81 whenever the pressure created by the pump exceeds a predetermined point.

Figure 6:
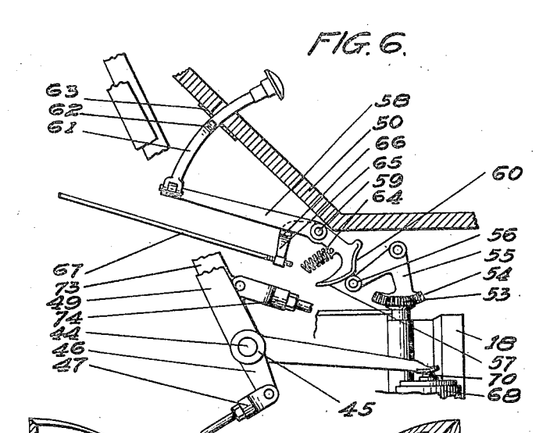
Figure 6 illustrates the normal running position of the throttle accelerator lever.
Figure 7:
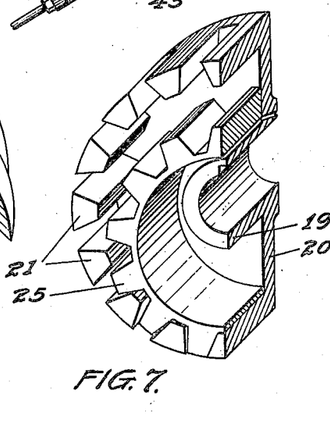
Figure 7 is a perspective view in section of the pumping apparatus.
Figure 8:
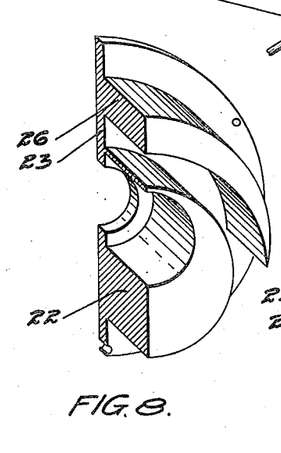
Figure 8 is a perspective view, also in section, of the eccentric on which the pump gear is mounted.

In the operation of the car, the driver will depress the treadle 61 to the position shown in Figure 6, thereby setting the controlling valve in the position shown in Figure 2, where the pump device will be inactive, the port 30, or the inlet to the chamber 31, being closed by the plunger head 35. The clutch plunger and the brake plunger will therefore remain in the depressed position indicated in Figure 2, the pump gears will continue to be inactive until such time as the controlling valve is moved to the position shown in Figure 3, whereupon the pumping gears will become active to raise the inelastic fluid through the chamber 31 and around to the chamber 33, and the outlet port 32 from this chamber being closed by the position of the valve, the accumulation of pressure in the chamber 33 will obviously lift the clutch and brake plungers automatically and disengage the clutch and simultaneously set the brake.

If desired, I may dispense with the brake cylinder 68 and its piston for, as the pressure increases in the chamber 33, it will operate against the teeth of the gears 21 and 25, thereby producing a braking action sufficient to bring the car to a dead stop without the use of the service brake.

I claim as my invention:

1. An automatic control for power propelled vehicles comprising a pump, a fluid circulating system therefor, a controlling valve operable to open the suction side of the pump to supply of fluid and close the exhaust side to render the pump active and create a pressure on the exhaust side of the pump, means actuated by the pressure on the exhaust side of said pump, and a rod connected with said means and with the controlling mechanism of the vehicle.

2. In combination with a control lever, a clutch rod, a hydraulically operated means for moving said rod and disengaging the clutch, a controlling valve for said means set in a neutral position by the initial movement of said control lever and moved to a point to render said hydraulically operated means active through subsequent adjustment of said control lever.

3. An automatic control for power propelled vehicles comprising a pump, a fluid circulating system therefor, means for opening the suction side of the pump and closing the exhaust side for creating a pressure on the exhaust side, a clutch, and a piston connected therewith and actuated by the pressure on said exhaust side of the pump for disengaging the clutch.

4. In combination with a control lever and clutch rod, a casing to contain an inelastic fluid, a pump, a valve operable from said control lever and disposed to open the suction side of the pump to create a pressure of the fluid on the exhaust side of the pump, and mechanism operatively related to the clutch rod and operable from the pressure on the exhaust side of the pump to release the clutch.

5. In combination with a control lever and clutch rod, transmission gearing and a casing to contain an inelastic fluid, a pump operatively connected with said transmission gearing, means effecting a cooperative connection between the exhaust side of the pump and clutch rod, and a valve operable from said control lever and disposed to open the suction side and close the exhaust side of the pump to create a pressure of the fluid on the exhaust side of the pump to operate the clutch rod and release the clutch.

6. An automatic control for power propelled vehicles comprising a pump, a fluid circulating system therefor, means including a valve disposed to open the suction side and close the exhaust side of the pump for creating a pressure on the exhaust side of the pump, and means actuated by the pressure on the exhaust side for controlling the vehicle clutch.

7. An automatic control for power propelled vehicles comprising a pump, a fluid circulating system therefor, in communication with the transmission casing of the vehicle, a controlling device mounted to create a pressure on the exhaust side of the pump, a clutch rod and brake connection, and means actuated by the pressure on said exhaust side for operating said clutch rod and brake connection.

8. In combination with a control lever, a clutch rod and brake connection, a transmission gearing and casing therefor adapted to contain a supply of inelastic fluid, a pump device having a pumping chamber and mechanism actuated by the pressure of the inelastic fluid in said chamber for operating said clutch rod and brake connection to disengage the clutch and set the brake, and a valve operatively connected with said control lever and disposed to open the suction side and close the exhaust side to render the pump active to create pressure of the fluid on the exhaust side, and close the suction side and open the exhaust side to render the pump inactive.

9. In combination with a controlling means, a clutch rod, a transmission gearing and casing therefor adapted to contain a supply of inelastic fluid, a pump device having a pumping chamber provided with a relief port and spring actuated valve therefor, mechanism actuated by the pressure of the inelastic fluid in said chamber for operating said clutch rod to disengage the clutch, and a device actuated through the movement of said controlling means for rendering said pump device active or inactive.

10. An automatic control for power propelled vehicles comprising a pump, a fluid circulating system therefor, means including a valve disposed to open the suction side and close the exhaust side of the pump to create a pressure on the exhaust side of the pump, and means actuated by the pressure on the exhaust side for controlling the vehicle brake.

11. An automatic control for power propelled vehicles comprising a pump, a fluid circulating system therefor, in communication with the transmission casing of the vehicle, a controlling valve mounted to obstruct the flow of the fluid in said system and thereby create a pressure on the exhaust side of the pump, a clutch, and a system connected therewith and communicating with said system and actuated by the pressure on said exhaust side of the pump for disengaging the clutch.

12. An automatic brake control for power propelled vehicles comprising a pump, a fluid circulating system, in communication with the transmission casing of the vehicle, a controlling valve mounted to obstruct the flow of the fluid in said system, a clutch, and pistons having cylinders communicating with said system and operatively connected respectively with the clutch and brake, the obstruction of the flow of fluid in said system creating a pressure on the exhaust side of the pump for operating said pistons to disengage the clutch and set the brake.

13. An automatic control for power propelled vehicles comprising a pump, a fluid circulating system therefor, in communication with the transmission casing of the vehicle, means for creating a pressure on the exhaust side of the pump, and means actuated by said pressure for controlling the vehicle brake and clutch.

14. An automatic control for power propelled vehicles comprising a fluid circulating system, means including a valve disposed in the circulating system for opening the suction side and closing the exhaust side of the system for creating a pressure in said circulating system, and mechanism actuated through the pressure of the fluid on the exhaust side of said pressure creating means for controlling the clutch of said vehicle.

15. An automatic control for power propelled vehicles comprising a fluid circulating system, in communication with the transmission casing of the vehicle, means for creating a pressure in said circulating system, and mechanism actuated through the pressure of the fluid on the exhaust side of said pressure creating means for controlling the clutch and brake of said vehicle.

16. An automatic control for power propelled vehicles comprising a fluid circulating system, in communication with the transmission casing of the vehicle, means in the system for obstructing the flow of fluid and thereby creating a pressure on the exhaust side of the system, whereby movement of the circulating fluid will be retarded, for the purpose specified.

17. An automatic control for power propelled vehicles comprising a pump and a fluid circulating system therefor, in communication with the transmission casing of the vehicle, means in said system for obstructing the flow of fluid therein to create a pressure on the exhaust side of the pump, clutch and brake cylinders, and a pipe connecting said cylinders with the exhaust side of the pump between said obstructing means and the exhaust port of the system.

18. In a control mechanism for motor vehicles, the combination with the engine throttle, the clutch and the brake of a motor vehicle, of a lever for actuating the throttle, pedals for actuating the clutch and brake, and supplementary mechanism for actuating the clutch and brake controlled through said lever.

19. In a control device for motor vehicles, the combination with the engine throttle, clutch and brakes of a motor vehicle, of a lever for actuating the throttle, pedals for actuating the clutch and brake, and supplementary mechanism for actuating the clutch and brake controlled through said lever, the clutch control by its pedal being independent of said mechanism.

20. In a vehicle control mechanism, the combination with the engine throttle, the clutch and the brakes of a motor vehicle, of a control member for each of said devices, and a supplementary mechanism for actuating the clutch and brakes from the control device for the throttle.

21. In a vehicle control mechanism, the combination with the engine throttle, clutch and brakes of a motor vehicle, of a lever for actuating the throttle, pedals for actuating the clutch and brake, a supplemental actuating device for the clutch and brakes employing power of the engine, and means for controlling said device from the throttle lever.

22. In a control mechanism for motor vehicles, the combination with the engine throttle, the clutch and brake of a motor vehicle, of a lever for controlling the throttle, a lost motion mechanism for actuating the throttle from said lever affording a movement of the latter beyond its idling position independently of the throttle, and a lost motion mechanism for controlling the clutch and brake unaffected by normal movement of the throttle lever but operable upon movement thereof beyond its idling position.

23. A combined clutch and brake control for power propelled vehicles comprising a pedal arm, an accelerator rod actuated thereby, a fluid circulating system, a clutch and brake operating means therein, and a valve operated by said pedal arm at a predetermined point in its stroke, and mounted in said system, for controlling the movement of said clutch and brake operating means.

24. A combined clutch and brake control for power operated vehicles comprising a pedal arm, a fluid circulating system, a clutch and brake operating means therein, a valve for controlling the flow of inelastic fluid through said system, the initial movement of said pedal arm operating said valve to open said circulating system to connect clutch and release said brake, continued movement of said pedal arm operating the accelerator independently of said clutch and brake control, the return of said pedal arm to its normal position operating said valve to disconnect the clutch and set the brake.

25. A brake control for power propelled vehicles comprising a pedal arm, an accelerator rod actuated thereby, a fluid circulating system, a brake operating means therein, and a valve for controlling the flow of fluid through said system and operated by said arm during a part of its stroke to release said fluid and actuate said brake operating means.

26. A combined clutch and brake control for power propelled vehicles, comprising an arm, an accelerator rod actuated thereby during a portion of its stroke, a fluid circulating system, a clutch and brake operating means therein, and means mounted in said system and operated by said arm during a part of its stroke for controlling the movement of said clutch and brake operating means.

27. A combined clutch and brake control for power propelled vehicles, comprising a foot operated means, an accelerator device actuated thereby during a portion of its stroke, a fluid circulating system, a clutch and brake operating means in said system, and means operated by said foot operated means during a certain portion of its stroke for controlling the movement of said clutch and brake operating means.

28. A combined clutch and brake control for power propelled vehicles, comprising a foot operated arm, an inelastic fluid circulating system, a clutch and brake operating means in said system, and means controlled by said arm, during its movement in one direction, for (1) releasing said brake and (2) connecting said clutch, and during its movement in the opposite direction, for (1) releasing said clutch and (2) setting said brake.

29. The combination with a motor vehicle transmission and clutch shaft, of a fluid brake for the vehicle including a pump case formed from a wall of the transmission case and provided with a pump chamber communicating with the transmission case, a pump gear carried by the clutch shaft and rotatable within the pump chamber, a pump gear carried by the countershaft of the transmission and mounted within the pump chamber to cooperate with the said first mentioned pump gear for normally maintaining a flow of lubricant from the transmission case through the pump chamber, the said gears being adapted to have operative connection with the propeller shaft of the vehicle, and means for checking the flow of lubricant between the pump chamber and transmission case.

30. A fluid brake for motor vehicles including a fluid chamber, a pump case having a pump chamber communicating with the fluid chamber, pumping means within the pump chamber operable to set up a flow of fluid between the chambers, means for checking such flow, the pump case being formed with a valve chamber opening into the pump chamber and provided with a vent passage communicating with the fluid chamber, a valve plug slidable within the valve chamber, yieldable means normally urging the valve plug to closed position, and means for adjustably tensioning the said yieldable means, the valve plug being shiftable to uncover said vent passage for venting the pump chamber at a predetermined fluid pressure therein.

31. The combination with a motor vehicle transmission and clutch shaft, of a fluid brake including braking fluid pumping means operable by the clutch shaft and normally free with respect to the driving shaft of the transmission but adapted to be coupled with the driving shaft when said shaft is coupled with the clutch shaft through the transmission, and means for checking the flow of fluid pumped by said means.

32. The combination with a motor vehicle transmission, of a fluid brake including coacting braking fluid pumping means carried respectively by the clutch shaft and a shaft of the transmission and effective through the transmission when actively coupled with the clutch shaft, and means for checking the flow of said fluid.

33. In a fluid brake for motor vehicles the combination of a fluid chamber, a pump case having a pump chamber in communication with the fluid chamber, means within the pump chamber operable to set up a flow of fluid between the chambers and adapted for connection with a vehicle propeller shaft, and means for automatically venting the pump chamber whereby to prevent locking of the propeller shaft.

In witness whereof, I have hereunto set my hand this 4" day of November 1915.

EDWIN GUSTAVE STAUDE.